US008229431B2

(12) United States Patent
Buckley et al.

(10) Patent No.: US 8,229,431 B2
(45) Date of Patent: Jul. 24, 2012

(54) APPARATUS, AND ASSOCIATED METHOD, FOR FACILITATING SELECTION BY A MOBILE NODE OF A NETWORK PORTION TO COMMUNICATE TO EFFECTUATE A SELECTED COMMUNICATION SERVICE

(75) Inventors: Adrian Buckley, Tracy, CA (US); Nicholas P. Alfano, Stratford-Upon-Avon (GB)

(73) Assignee: Research In Motion Limited, Waterloo (CA)

( * ) Notice: Subject to any disclaimer, the term of this patent is extended or adjusted under 35 U.S.C. 154(b) by 95 days.

(21) Appl. No.: 11/046,086

(22) Filed: Jan. 28, 2005

(65) Prior Publication Data
US 2006/0172735 A1 Aug. 3, 2006

(51) Int. Cl.
H04W 4/00 (2009.01)
H04W 36/00 (2009.01)

(52) U.S. Cl. .................. 455/435.3; 455/432.3; 455/434; 455/436

(58) Field of Classification Search ............... 455/435.3, 455/434, 435.2, 432.3, 442, 436, 433, 560, 455/418; 370/331
See application file for complete search history.

(56) References Cited

U.S. PATENT DOCUMENTS

| 5,903,832 | A | * | 5/1999 | Seppanen et al. ........... 455/435.3 |
| 5,950,130 | A | * | 9/1999 | Coursey ...................... 455/432.1 |
| 5,983,115 | A |   | 11/1999 | Mizikovsky et al. |
| 5,999,811 | A | * | 12/1999 | Molne ......................... 455/432.3 |
| 6,101,392 | A | * | 8/2000 | Corriveau ..................... 455/458 |
| 6,108,540 | A | * | 8/2000 | Sonti et al. .................... 455/433 |
| 6,397,064 | B1 | * | 5/2002 | Bridges et al. ............. 455/432.3 |
| 6,405,040 | B1 | * | 6/2002 | Liu et al. ..................... 455/435.3 |
| 6,415,148 | B1 | * | 7/2002 | Chiniga et al. ................ 455/434 |
| 6,466,802 | B1 | * | 10/2002 | Blakeney et al. ........... 455/552.1 |
| 6,564,055 | B1 | * | 5/2003 | Hronek .......................... 455/433 |
| 6,584,311 | B1 | * | 6/2003 | Sorenson et al. .......... 455/432.1 |
| 6,584,312 | B1 | * | 6/2003 | Morin et al. ................... 455/433 |
| 6,684,082 | B1 | * | 1/2004 | McClure .................... 455/552.1 |
| 6,778,827 | B1 | * | 8/2004 | Anderson et al. ............. 455/434 |
| 6,782,259 | B2 | * | 8/2004 | Bamburak et al. ............ 455/434 |
| 7,103,358 | B2 | * | 9/2006 | Rodriguez et al. ......... 455/432.3 |
| 7,133,677 | B2 | * | 11/2006 | Feder et al. .................... 455/443 |
| 7,139,570 | B2 | * | 11/2006 | Elkarat et al. .............. 455/432.3 |
| 7,139,587 | B2 | * | 11/2006 | Ishii ........................... 455/552.1 |
| 7,164,885 | B2 | * | 1/2007 | Jonsson et al. ............... 455/41.2 |
| 7,171,216 | B1 | * | 1/2007 | Choksi ....................... 455/456.1 |
| 7,194,264 | B2 | * | 3/2007 | Li et al. ...................... 455/432.1 |
| 7,215,754 | B1 | * | 5/2007 | Woodson et al. ........ 379/221.09 |
| 7,277,705 | B2 | * | 10/2007 | Casaccia et al. ........... 455/435.1 |
| 7,664,499 | B2 | * | 2/2010 | Bamburak et al. ......... 455/435.3 |
| 2002/0039892 | A1 |   | 4/2002 | Lindell |
| 2002/0177476 | A1 | * | 11/2002 | Chou ............................ 455/574 |
| 2003/0104811 | A1 | * | 6/2003 | Petrakos et al. ............... 455/432 |

(Continued)

FOREIGN PATENT DOCUMENTS
WO WO01/47315 A1 6/2001
(Continued)

*Primary Examiner* — Christopher M Brandt

(57) ABSTRACT

Apparatus, and an associated method, for facilitating selection of a radio access network with which a roaming mobile node attempts to effectuate communications pursuant to a selected communication service. Listings are maintained at the mobile node, each containing entries of networks and their communication service capabilities. Different listings identify networks of differing preference levels. Detection is made of available networks, and a selector selects with which network to attempt to communicate based upon network availability, network capability, and preference.

27 Claims, 6 Drawing Sheets

U.S. PATENT DOCUMENTS

| | | | |
|---|---|---|---|
| 2004/0116117 A1* | 6/2004 | Ahvonen et al. | 455/432.3 |
| 2004/0198360 A1 | 10/2004 | Kotzin | |
| 2004/0203648 A1* | 10/2004 | Wong | 455/414.1 |
| 2004/0203775 A1 | 10/2004 | Bourdeaut et al. | |
| 2005/0037755 A1* | 2/2005 | Hind et al. | 455/435.3 |
| 2005/0059397 A1* | 3/2005 | Zhao | 455/435.2 |
| 2005/0063338 A1* | 3/2005 | Tsui | 370/331 |
| 2005/0096056 A1* | 5/2005 | Klehn et al. | 455/445 |
| 2005/0096072 A1* | 5/2005 | Rahman et al. | 455/466 |
| 2005/0101323 A1* | 5/2005 | De Beer | 455/435.2 |
| 2005/0221821 A1* | 10/2005 | Sokola et al. | 455/432.3 |
| 2005/0233734 A1* | 10/2005 | Rajkotia et al. | 455/414.1 |
| 2005/0233744 A1* | 10/2005 | Karaoguz et al. | 455/432.3 |
| 2005/0233749 A1* | 10/2005 | Karaoguz et al. | 455/442 |
| 2005/0239463 A1* | 10/2005 | Lagnado | 455/435.2 |
| 2005/0255886 A1* | 11/2005 | Aaltonen et al. | 455/558 |
| 2006/0052100 A1* | 3/2006 | Almgren | 455/432.1 |
| 2006/0077986 A1* | 4/2006 | Rune | 370/401 |
| 2006/0104211 A1* | 5/2006 | Islam et al. | 370/252 |
| 2007/0037575 A1* | 2/2007 | Braam et al. | 455/435.3 |
| 2007/0072579 A1* | 3/2007 | Paila et al. | 455/343.2 |
| 2007/0213050 A1* | 9/2007 | Jiang | 455/432.3 |

FOREIGN PATENT DOCUMENTS

| | | | |
|---|---|---|---|
| WO | WO02/32178 A1 | | 4/2002 |
| WO | WO 02/067563 | * | 8/2002 |
| WO | WO02/067563 A1 | | 8/2002 |
| WO | WO02/076131 | | 9/2002 |
| WO | WO2004/077752 A1 | | 9/2004 |

* cited by examiner

APPARATUS, AND ASSOCIATED METHOD, FOR FACILITATING SELECTION BY A MOBILE NODE OF A NETWORK PORTION TO COMMUNICATE TO EFFECTUATE A SELECTED COMMUNICATION SERVICE

The present invention relates generally to a manner by which to facilitate selection, at a mobile node, of a network portion of a network having a plurality of network portions with which to effectuate a selected communication service. More particularly, the present invention relates to apparatus, and an associated method, by which to select the network portion based upon whether the network portion is capable of operation to effectuate the selected communication service and upon preference levels defined at the mobile node and associated with different ones of the network portions.

A database is maintained at the mobile node. The database defines lists, each containing entries identifying network portions of common preference levels together with communication service capabilities of the networks. The database is accessed when a communication service is to be effectuated. And, selection is made at the mobile node of with which network portion to effectuate communications by accessing one or more of the lists, as needed, to identify and select the network portion that is capable of effectuating the selected communication service.

BACKGROUND OF THE INVENTION

Many different types of communication systems have been developed and deployed, available for use to effectuate many different types of communication services. Many varied communication services are effectuated through use of different ones of the communication systems. Many of such communication services are practical necessities for many. And, ready access to communicate by way of an appropriate communication system is correspondingly necessary.

Improved, and additional types of, communication services shall likely become available as technological advancements warrant. When technological advancements are implemented in communication systems, the communication systems generally provide for more efficient communication of data, communication of data at higher communication rates, or communication of data in manners that better provide for successful communication of the data when communicated in adverse communication conditions. Many modern communication systems make use of digital communication techniques. Use of digital communication techniques provides various advantages that facilitate successful communication of data between communication stations of a communication system. Improved communication efficiencies are possible as communication redundancies are able to be removed from data prior to its communication. When the data is free of redundancies, the informational content of the data is able to be communicated with reduced bandwidth allocations or in reduced amounts of time. Additionally, the data that is to be communicated is more readily manipulated, such as by encoding, to increase the likelihood that the informational content of the data is successfully communicated upon communication channels susceptible to communication degradation.

A radio communication system is an exemplary type of communication system and is exemplary of communication systems that utilize digital communication techniques. In a radio communication system, data is communicated between communication stations by way of radio channels. Radio channels are defined upon a portion of the electromagnetic spectrum. When the radio communication system is regulated by regulatory bodies, the portion of the electromagnetic spectrum at which the radio channels are defined is allocated to the communication system. The communication stations operable in the radio communication system include at least a sending station and a receiving station. The sending station operates to convert data that is to be communicated into a form to permit its communication upon a radio communication channel. And, the receiving station operates to detect the data communicated upon the communication channel and to recover the informational content of the detected data.

Because channels are defined upon the electromagnetic spectrum in a radio communication system, various advantages are provided by radio communication systems over their wireline counterparts. Because need for a wireline connection to interconnect the communication stations of a radio communication system are obviated, communication of data is effectuable between communication stations positioned at locations between which wireline connections are unable easily to be formed. And, freed of the need to interconnect the communication stations by way of fixed, wireline connections, a radio communication system is amenable for implementation as a mobile communication system. In a mobile communication system, one or more of the communication stations between which data is communicated is provided mobility.

A cellular communication system is a mobile communication system. In a typical cellular communication system, a communication network is formed of a plurality of fixed-site base transceiver stations. The base transceiver stations are deployed at spaced-apart locations throughout an area that is to be encompassed by the communication system. Cells are defined that are the coverage areas associated with individual ones of the base transceiver stations. Radio communications are effectuated between a mobile node and a base transceiver station in whose cell that the mobile node is positioned. The conventional cellular communication systems provide for telephonic communications by a user of the mobile node. Through appropriate positioning of the base transceiver stations, a mobile node is always positioned within relatively close proximity to at least one of the base transceiver stations when the mobile node is positioned within the area encompassed by the cellular communication system. Because of the proximity, only relatively low-powered signals are required to be communicated by the mobile node to effectuate communications.

Generally, cellular communication systems are operated in conformity with an operating specification promulgated by a standard-setting body. Successive generations of operating specifications have been promulgated, and successive generations of cellular communication systems have been deployed in conformity with such operating specifications.

The networks of more than one generation of cellular communication systems might, for instance, be deployed over a common, or overlapping, area and be concurrently operable to provide for radio communications with mobile nodes operable in the respective communication systems. And, separate networks, operated by separate network operators, of the same generation might also be deployed over a common, or overlapping, area, also to be operable concurrently.

Generally, a service subscription is purchased by a user of the mobile node, and the mobile node is authorized to communicate by way of a communication system pursuant to the service subscription. The mobile node is typically associated with a home network portion. The home network portion is typically a network portion that is installed to encompass an area in which the user of the mobile node is most regularly positioned. However, because a mobile node is inherently mobile, the user of the mobile node, carrying the mobile node, might well roam beyond the coverage area of the home network portion associated with the mobile node. When the mobile node roams beyond its home network, the mobile node might be positioned at a location encompassed by another network portion, a visited network.

When the mobile node roams beyond its home network, the mobile node is selectably permitted to communicate by way of one, or more, of the visited networks in whose coverage area that the mobile node roams. Permission to communicate by way of a visited network is dependent, among other things, upon whether the mobile node and the visited network operate pursuant to compatible operating specifications. Also, agreements between operators of the visited and home networks are additionally determinative of whether the mobile node is permitted to communicate by way of a particular visited network.

Additionally, the mobile node might roam into an area encompassed by more than one network, each of which is available to the mobile node through which to communicate. A decision is made as to which of the available networks that the mobile node communicates. Conventional mechanisms are used in the decision-making process, typically including use of a defined set of preferred roaming partners. An operator of the home network associated with the mobile node maintains a list of the preferred networks. When the mobile node roams into a visited network, the mobile node communicates by way of the network listed on the preferred list.

While, historically, cellular communication systems have provided merely telephonic voice communications, increasingly, cellular communication systems provide for packet data communication services. Legacy networks, providing only voice or limited data services, are deployed in areas in which new-generation cellular communication systems that provide for increasingly-intensive data communication services are also deployed. A mobile node, capable of communicating pursuant to a new-generation, data communication service must communicate by way of a network that provides for such new-generation packet communication service for the effectuation of such service. Accordingly, when selection is to be made of with which visited network that a mobile node is to communicate, the capability of the visited network must be taken into account. A manner by which to facilitate such selection is needed.

It is in light of this background information related to communications in a radio communication system that the significant improvements of the present invention have evolved.

SUMMARY OF THE INVENTION

Accordingly, the present invention advantageously provides apparatus, and an associated method, by which to facilitate selection, at a mobile node, of a network portion of a network having a plurality of network portions with which to effectuate a selected communication service.

Through operation of an embodiment of the present invention, a manner is provided by which to select the network portion with which to communicate based upon the network portion is capable of operation to effectuate the selected communication service and upon preference levels defined at the mobile node and associated with different ones of the network portions.

The mobile node maintains a database at which lists are defined. Each of the lists contains entries identifying network portions together with communication service capabilities of the identified networks. And, each list defines a preference level, associated with each of the identified networks forming the entries of each of the respective lists.

When a communication service is to be initiated by the mobile node, the mobile node makes a determination as to with which network portion that the mobile node shall attempt to communicate by way of which to effectuate the selected communication service. Selection is made, in part, responsive to access to one or more of the lists defined by the databases maintained at the mobile node. Because the lists include identification of the communication service capabilities of the network portions forming the entries of the lists, the mobile node is able to select a network portion with which to communicate on the basis, in part, upon whether the network portion supports the communication service that is to be effectuated. Network portions that do not support the communication service that is to be effectuated, and attempts to communicate with such network portions are not undertaken.

In one aspect of the present invention, first and at least second database listings are formed at the mobile node. Each of the database listings is formed of a set of entries of network portions. The entries of the set of entries forming the first database listings are each associated with a first level of preference by the mobile node with which to communicate. And, the second database listing is formed of a second set of entries of network portions. The network portions forming the entries of the second set are all associated with a second level of preference by the mobile node with which to communicate. Each of the network portions forming the entries of the first and at least second database listings further have associated therewith indications of the communication service capabilities of the network portions. That is to say, indexed together with the network portion identity is an indication of what communication services are able to be provided by the network portion.

In another aspect of the present invention, a detector detects which of the network portions are within communication range of the mobile node. That is to say, detection is made of within the coverage areas of which network portions that the mobile node is positioned. Detection is made, for instance, by detecting the broadcast signals broadcast by individual ones of the network portions. Broadcasts are made, for instance, by different ones of the network portions upon different channels. The mobile node tunes to the different ones of the channels upon which network portions broadcast signals and detects whether the broadcast signals are broadcast thereon. Through such detection, the mobile node is made aware of the network portions that are potentially available to the mobile node through which to communicate. A list of available network portions is formed, based upon the detections of the broadcast signals, or otherwise made by the detector. The available network portion list is compared when a selected communication service is to be initiated, with the entries contained in one or more of the database listings.

A selector, pursuant to, or responsive to, the comparisons between the available network portion list and the database listings selects with which of the network portions that the mobile node shall attempt to communicate, thereby to effectuate a selected communication service. Selection made by the selector selects a network portion that is available and that also is capable of providing the selected communication service.

In one implementation, the first database listing lists entries identifying network portions that are most-preferred with which to communicate, if possible. And, the entries of the second database listing identify the network portions that are less-preferred than the network portions identified in the first database listing. If no network portion listed on the first database listing is available and also is capable of providing the selected communication service, the second database listing is accessed, and the selector selects, if possible, a network portion contained in the second database listing with which to communicate to effectuate thereby the selected communication service.

In a further aspect of the present invention, a prohibited-network database listing is further maintained at the mobile node. The prohibited-network database listing contains a set of entries that identify network portions with which the mobile node is prohibited from using to effectuate communications. If a mobile node is positioned at a location encompassed by a coverage area of one of the network portions listed on the prohibited-network database listing, the mobile node does not attempt to effectuate communications therewith. In this further aspect of the present invention, the selector also operates to prevent the mobile node from attempting to communicate with a network portion listed on the prohibited network database listing to effectuate the selected communication service.

In another aspect of the present invention, the communication service capabilities of the network portions identified in the different ones of the database listings identify the communication services that the associated network portions are capable of providing. In an alternate implementation, the tiers of service are defined. A tier of service is defined in terms of communication services of which a network portion is capable. For a network portion to be able to provide a selected tier of service, the network portion must be capable of providing all of the communication services that define the selected tier of service. Separate tiers of service are defined, each tier of which defining a separate set of communication services. When selection is to be made of with which network portion that the mobile node attempts to communicate to effectuate the selected communication service, selection is made based upon the tier of service associated with the network portion contained, and forming, the separate database listings.

Selection of the network portion with which the mobile node attempts to communicate to effectuate the selected communication service is thereby dependent upon availability of the network portion, the capability of the network portion to provide the selected communication service, and the level of preference associated with the network portion. If a network portion noted on a most-preferred list is capable of providing the selected communication service, the network portion is selected at the mobile node, and the mobile node attempts to communicate with the selected network portion. If communications cannot be effectuated or no network listed on the first database listing is both available and provides the communication service capability needed to effectuate the selected communication service, a database listing associated with less-preferred network portions with which to communicate is accessed and selection is made therefrom. Thereby, attempts to communicate with a network portion that is not capable of providing the selected communication service is not selected, and selection of a network portion with which to communicate is made from the less-preferred database listing.

In these and other aspects, therefore, apparatus, and an associated method, is provided for a radio communication system having a mobile node operable to effectuate at least a first selected communication service with a selected available network portion. The selected available network portion forms a portion of a network formed of a first network portion and at least a second network portion. The first network portion is capable of performing a first set of communication services, and in the least the second network portion is capable of performing a second set of communication services. Selection, at the mobile node, of with which, if any, of the first and at least second network portions to effectuate the first selected communication service is facilitated. A first database listing lists a first set of entries of network portions. Each entry of the first set of entries is associated with a first level of preference by the mobile node with which to communicate. At least a second database listing lists at least a second set of entries of network portions. Each entry of the second set of entries identifies network portions associated with a second level of preference by the mobile node with which to communicate. A selector is adapted to receive indications of when the mobile node is within coverage areas of the first and at least second network portions and adapted to access the first and at least second databases, respectively. The selector selects with which, if any, of the first and at least second network portions to effectuate the first selected communication service. Selection made by the selector is responsive to which, if any, of the first and at least second sets of communication services of which the first selected communication service is a member and with which of the first and at least second database listings that an associated one of the first and at least second network portions is associated.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
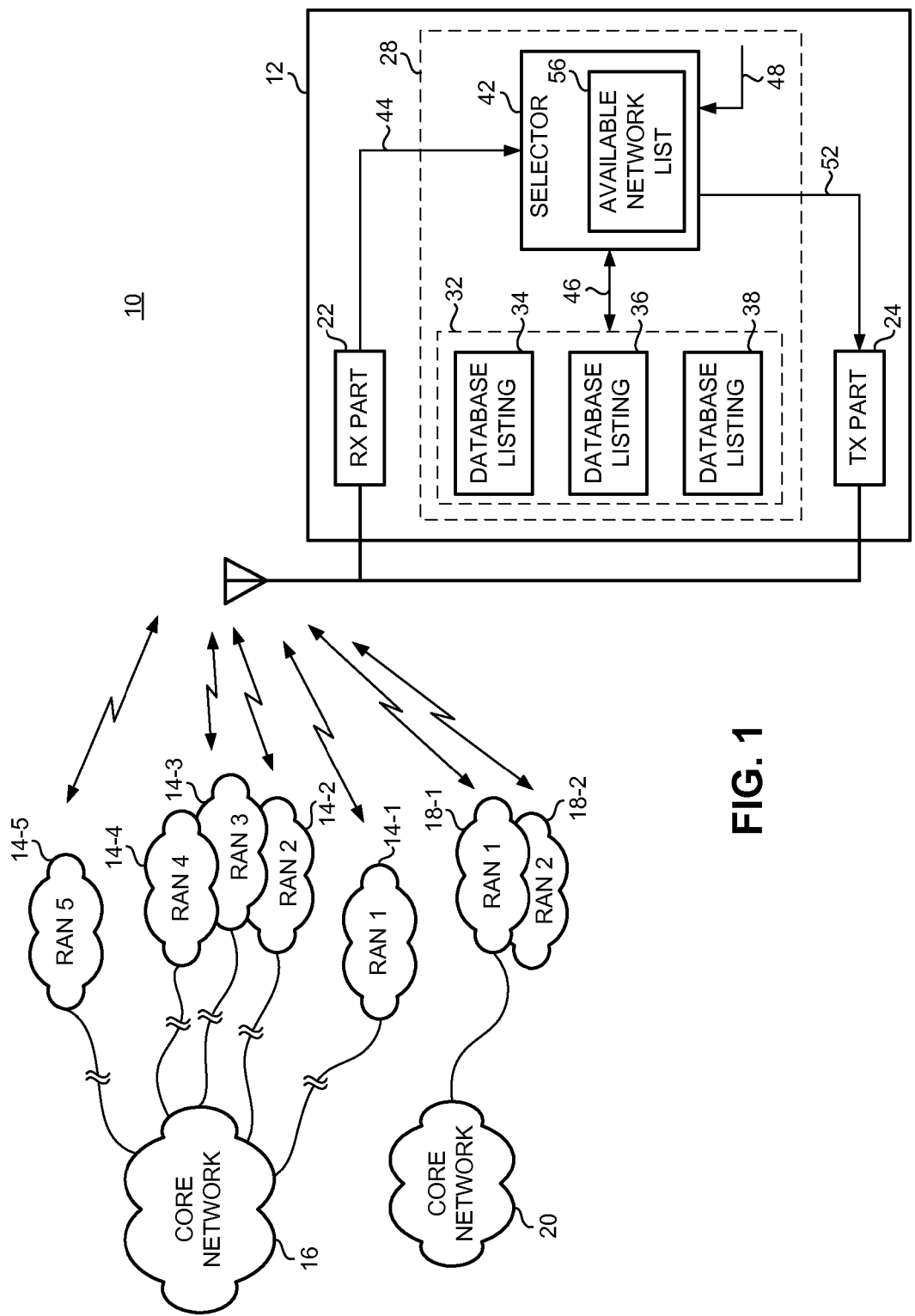
FIG. 1 illustrates a functional block diagram of a radio communication system in which an embodiment of the present invention is operable.

Referring first to FIG. 1, a mobile radio communication system, shown generally at 10, forms a multi-user communication system in which mobile nodes positioned within a coverage area of a network part of the communication system are selectably permitted to communicate therethrough to effectuate selected communication services. A representative mobile node 12 is shown in the Figure. Other mobile nodes can analogously be represented.

The mobile nodes are permitted movement, here at least throughout the geographical area encompassed by the network of the radio communication system. Movement permitted of the mobile node includes movement during effectuation of a communication service. And, the mobile node is also operable to effectuate different communication services at different times, when positioned at different locations.

The mobile radio communication system is representative of any of various types of cellular, or other radio, communication systems. In the exemplary implementation, at least parts of the network of the communication system are operable to provide data services, such as data services provided by a GSM/GPRS/EDGE (Global System for Mobile communications/General Packet Radio Service/Enhanced Data for GSM Evolution)-compliant communication system. Other portions of the communication system are operable in conformity with other operating specifications and are capable of providing different communication services, such as data communication services provided by an IEEE 802.11-component network. Here, for purposes of explanation, the mobile node is also operable in general conformity with the GSM/GPRS/EDGE operating specification and with an IEEE 802.11 operating specification. And, accordingly, the mobile node is capable of communicating data pursuant to effectuation of a high-speed, variable-rate, packet communication service.

The following description shall describe exemplary operation of the mobile radio communication system with respect to an implementation in which the mobile node is a GSM/GPRS/EDGE-capable device and selected portions of the radio communication system are also GSM/GPRS/EDGE-capable. This implementation is exemplary only. In other implementations, e.g., the mobile node is operable pursuant to another operating specification and is of other communication service capabilities in such other implementations. Description of operation of the communication system, and the mobile node operable therein, is analogously described with respect to such other implementations.

The network of the radio communication system includes a first plurality of network portions, i.e., radio access networks 14. Here, five radio access networks, networks 14-1, 14-2, 14-3, 14-4, and 14-5, of the plurality are shown. Additional networks can also analogously be represented. The radio access network 14-1 forms a home network associated with the mobile node. The home network includes functional entities (not shown) that maintain, e.g., permanent registry information of the mobile node, as well as other information associated with the mobile node. Typically, when the mobile node is positioned at a location within the coverage area of the home network, the mobile node communicates by way of its home network.

As the mobile node is permitted mobility, the mobile node might travel beyond the coverage area of the home network and into the coverage area of another network. For instance, the mobile node is repositionable into an area encompassed by the networks 14-2, 14-3, 14-4, or 14-5. The radio access networks 14-2, 14-3, and 14-4 are deployed over at least partially overlapping areas and exhibit at least partially overlapping coverage areas. The radio access networks 14-2, 14-3, and 14-4 are representative of different types of radio access networks, i.e., networks that are constructed pursuant to different operating specifications or, e.g., generational variations of an operating technology, here variants of the GSM specification. The radio access network 14-5 is representative of another network that defines another coverage area into which the mobile node might roam.

The radio access networks 14-1 through 14-5 are appropriately interconnected, such as by way of a core network 16, or any other appropriate communication medium or fabric through which communication paths are formable.

The network further includes a second plurality of network portions, i.e., radio access networks 18. Here two radio access networks, networks 18-1 and 18-2, of the second plurality are shown. Additional networks 18 can analogously be represented.

The networks 18 are representative of, e.g., networks operable pursuant to a variant of the IEEE 802.11 set of operating specifications. The networks 18 are connected to, and interconnected by, a core network 20.

The core networks 16 and 20 provide various communication functions, performing, e.g., mobility tracking, packet routing, service broadcast information. Additionally, the core networks provide connectivity to terrestrial wide area networks such as a PSTN (public-switched telephonic network) and the Internet.

Because different ones of the radio access networks 14 are constructed to be in conformity with different operating specifications, the communication service capabilities of the different ones of the radio access networks differ. When, for instance, the mobile node is positioned at a location encompassed by the radio access networks 14-2, 14-3, and 14-4, the type of communication service that is to be effectuated by the mobile node might be supported by one of the radio access networks and not by another of the radio access networks.

The mobile node 12 includes radio transceiver circuitry, here indicated to include a receive part 22 and a transmit part 24. The receive part of the radio transceiver circuitry data communicated to the mobile node by the network of the radio communication system. The data communicated to the mobile node is communicated upon radio downlink channels that are defined upon radio air interface. And, the transmit part of the radio transceiver circuitry operates to transmit data sourced at the mobile node upon radio uplink channels that are defined upon the radio interface.

In addition to the communication service capabilities of individual ones of the radio access networks, preference sometimes is given to use of one radio access network over another as a result of arrangements between operators of different ones of the radio access networks. Roaming, and other, agreements between operators of different networks define preferred networks through which a roaming mobile node is preferred, by the operator of its home network, to communicate. The selection made by the mobile node pursuant to operation of an embodiment of the present invention of with which radio access to communicate pursuant to a selected communication service is selectably further dependent upon preferences accorded to one radio access network over another.

The mobile node further includes apparatus 28 of an embodiment of the present invention. The apparatus operates to select, or to facilitate selection of, the radio access network through which the mobile node communicates, such as when the mobile node roams beyond its home network or otherwise is to communicate by way of a network other than its home network. The apparatus 28, in its selection, takes into account the availability of a radio access network, the communication service capabilities of the radio access network, and the level of preference associated with the radio access network. By basing the selection on this criteria, the mobile node is less likely to attempt to communicate with a radio access network pursuant to a selected communication service that is unable to effectuate the performance of the selected communication service.

The apparatus 28 includes a storage element 32. The storage element, in the exemplary implementation, is embodied at a SIM (Subscriber Identity Module) card, the characteristics of which are otherwise conventionally utilized in GSM radio communication systems. When the mobile node is operable pursuant to another operating specification, the storage element is embodied in another manner. For instance, in another implementation, the storage element is a storage device fixedly connected to, and forming a portion of, the circuitry of the mobile node.

Values stored at the storage element define database listings, here database listings 34, 36, and 38. Each of the listings is formed of entries that identify radio access networks. Communication service capabilities are also listed in each of the lists, indexed together with the identity of the radio access network of each entry.

The apparatus further includes a selector 42 that is coupled to the receive part 22 and to the storage element 32. The connections are functionally represented by lines 44 and 46, respectively. The selector is further coupled to receive indications of when a selected communication service is to be initiated by the mobile node and the type of communication service that is to be initiated. Such indications are here represented to be provided to the selector by way of the line 48. The selector operates to select a selected radio access network with which the mobile node shall attempt to communicate pursuant to effectuation of the selected communication service. Indications of the selection are provided, here by way of the line 52, to the transmit part 24 of the mobile node to cause the transmit part to attempt to communicate with the selected radio access network. Once a communication connection is formed, the communication service is effectuated.

During operation of the mobile node, the mobile node monitors channels upon which radio access network broadcasts control signals that identify the networks from which the signals are broadcast. When a mobile node detects a signal broadcast by a network, the indication is provided by way of the line 44 to the selector 42, and the identified network is added to an available network list 56, here maintained at the selector. The available network list, in the exemplary implementation, is an aggregated list that accumulates entries on the list, identifying the detected network, together with its communication service capability, and an indication of whether the network presently appears to be available. The communication service capability of the network is, for instance, also broadcast with the broadcast signals that identify the network. Detection of the signals indicates the network to be available. If the signals are subsequently no longer detected, the available network list indicates the network to be not presently available.

When the selected communication service is to be initiated, the selector accesses the available network list and also one or more of the database listings 34, 36, etc. If an entry on the first-accessed listing identifies a radio access network that exhibits the communication service capability permitting the selected communication service to be performed and also is available, as indicated by the available network list, the selector selects such radio access network, and communications are attempted to be effectuated therewith. If no entry is contained on the first-accessed listing that is both available and is capable of providing the selected communication service, a subsequent database listing is accessed. And, the selector attempts to select a radio access network from the next-accessed listing.

In the exemplary implementation, the first listing 34 lists identities of radio access networks that are most-preferred, the second database listing 36 identifies radio access networks that are next-most-preferred. Subsequent listings, if used, identify lesser-preferred radio access networks in successive, sequential manner. And, also in the exemplary implementation, a database listing, here the database listing 38, forms a prohibited network list. Entries contained on the prohibited network list are networks with which the mobile node is prohibited from communicating. Even if available, the mobile node does not attempt to communicate by way of a network listed on the prohibited-network list.

Figure 2:
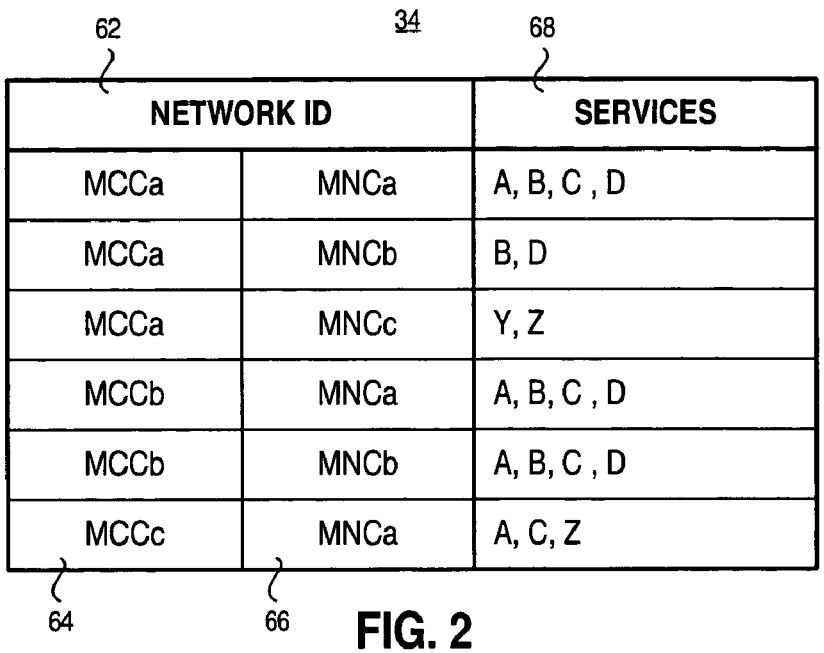
FIG. 2 illustrates an exemplary database listing at the mobile node, forming a portion of the radio communication system shown in FIG. 1, pursuant to an embodiment of the present invention.

FIG. 2 illustrates a representation of the listing 34, forming a portion of the apparatus 28 shown in FIG. 1. The listing is of most-preferred networks that are the most-preferred networks with which the mobile node is to communicate with, if possible. The listing includes identifications 62 of radio access networks, here defined in terms of mobile country codes (MCC) 64 and a mobile network code (MNC) 66. Communication service capabilities 68 are indexed together with the identified radio access network. Here, alphabetic identifiers identify the communication service capabilities. The identifiers identify, for instance, emergency call, circuit-switched capability, voice circuit switched capability, data services capability, internet messaging capability, web browsing, weather capability, stock quote capability, etc.

Figure 3:
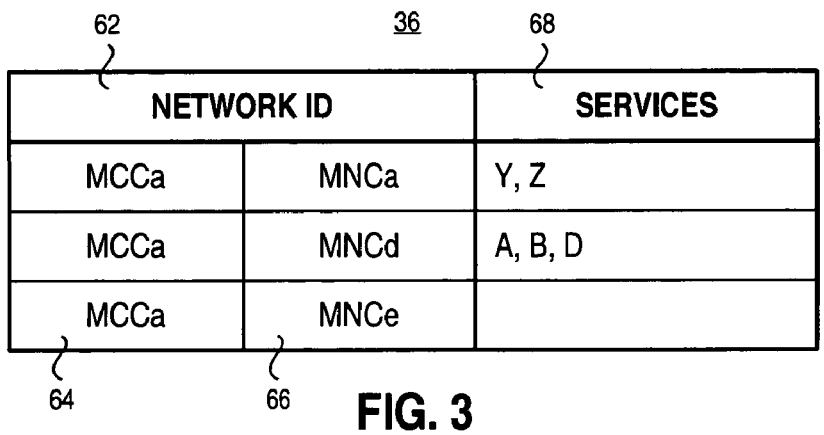
FIG. 3 illustrates another exemplary database listing embodied at the mobile node forming a portion of the radio communication system shown in FIG. 1, also pursuant to an embodiment of the present invention.

FIG. 3 illustrates the listing 36 that is also defined at the storage element 32 (shown in FIG. 1). Here, also, the listing includes entries formed of identifiers 62 that identify the MCC 64 and MNC 66 of the network. And, again, communication service capability 68 associated with the identified network is also indexed together therewith.

Figure 4:
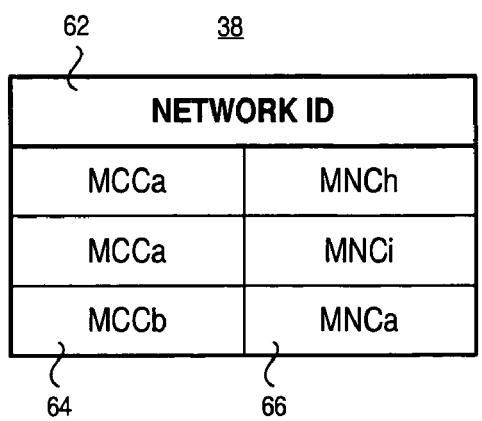
FIG. 4 illustrates another exemplary database listing, also embodied at the mobile node forming a portion of the radio communication system shown in FIG. 1, also pursuant to an embodiment of the present invention.

FIG. 4 illustrates the listing 38 of an embodiment of the present invention. The listing 38 here lists entries, also identified by identifiers 62 that identify the MCC 64 and MNC 66 of radio access networks. The list 38 forms a prohibited list that lists radio access networks with which the mobile node is prohibited from using through which to communicate. In contrast to the other listings 34 and 36, the listing 38 need not include communication service capabilities indexed together with the identifier that identifies the radio access networks forming the entries of the listing.

Figure 5A:
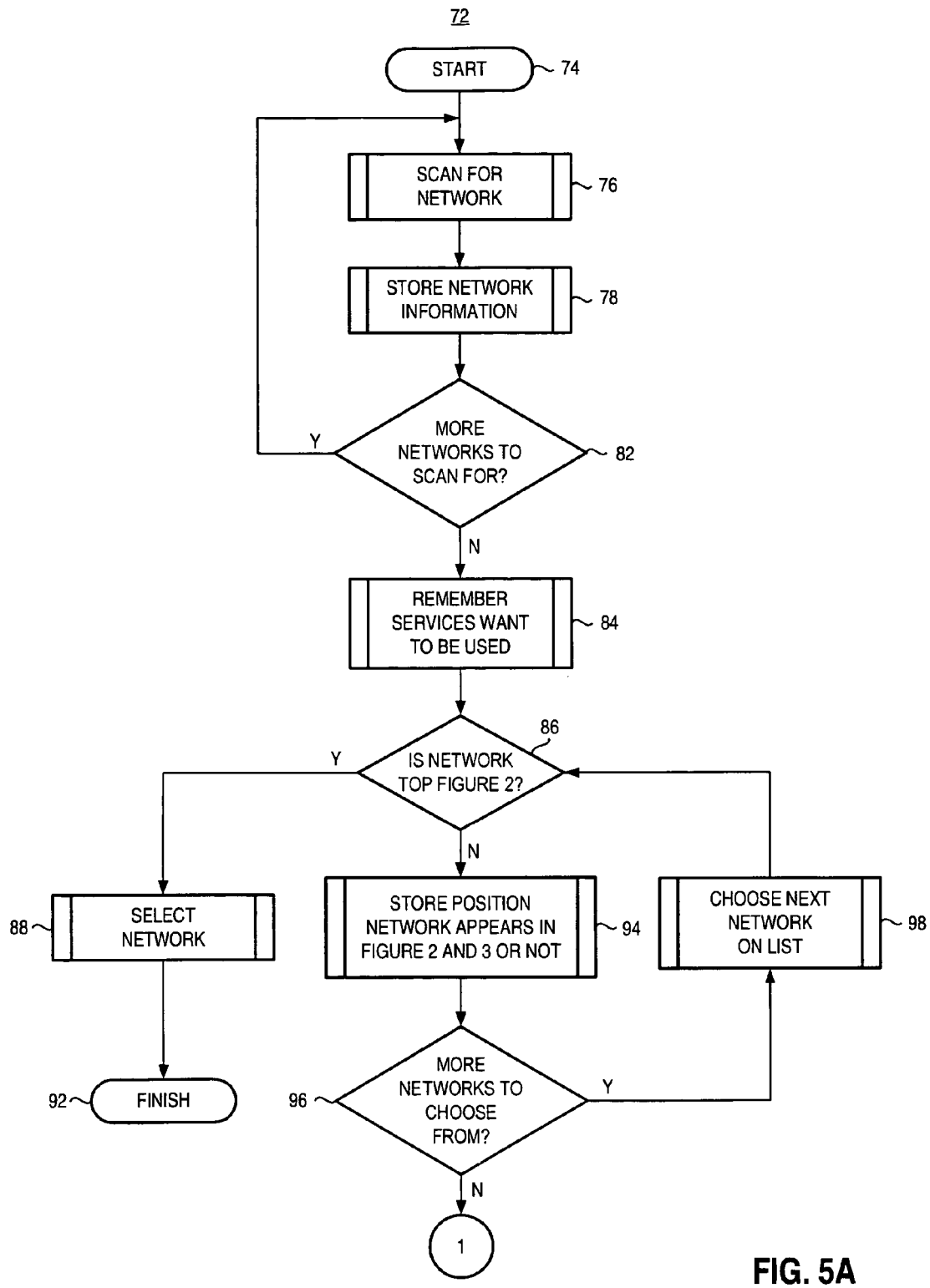
FIGS. 5A and 5B illustrate flow chart representative of operation of an embodiment of the present invention during operation of the communication system shown in FIG. 1.
Figure 5B:
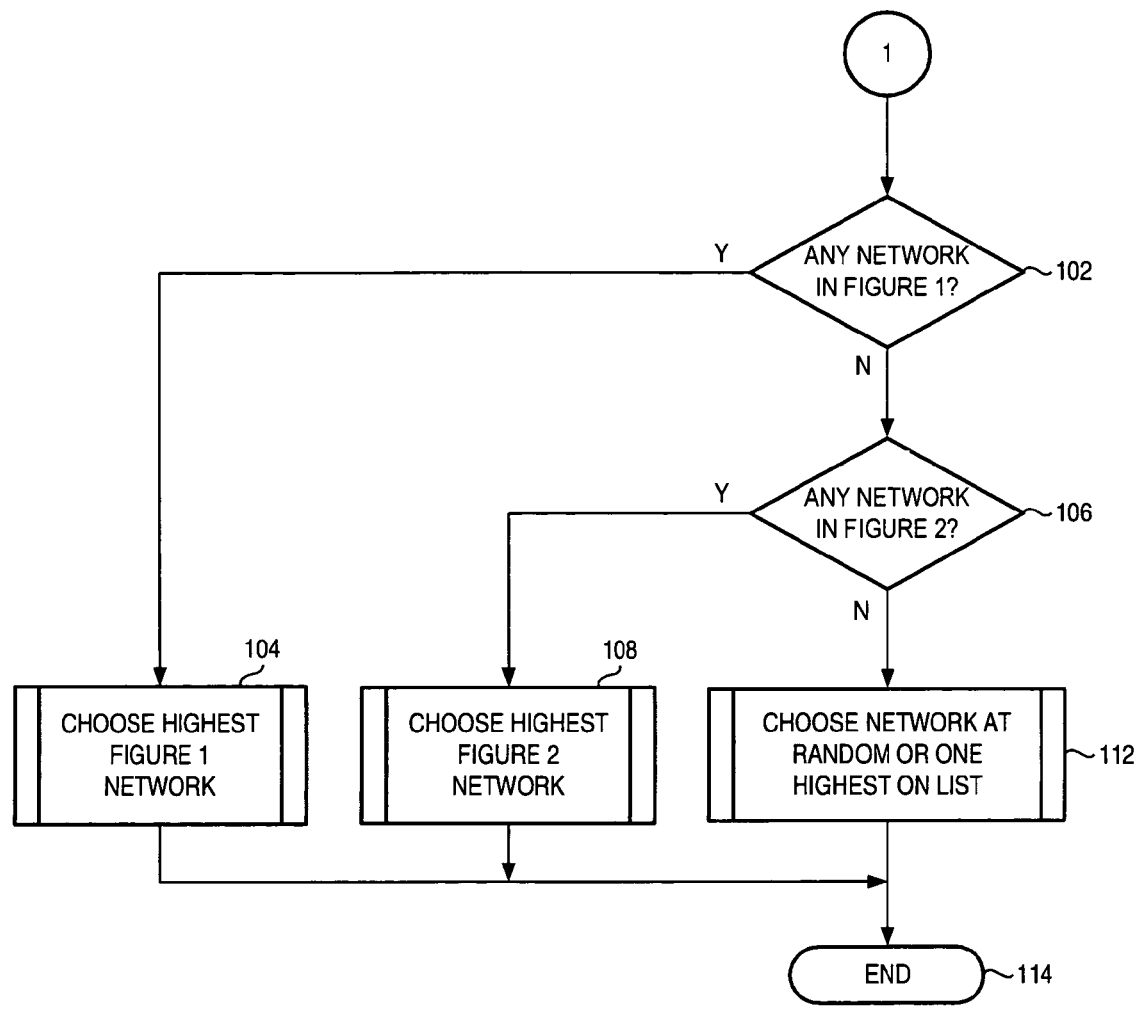

FIGS. 5A and 5B illustrate a flow chart, shown generally at 72, representative of operation of an embodiment of the present invention, such as operation of the apparatus 28 embodied at the mobile node. Operation commences with the START block 74.

First, and as indicated by the block 76, channels upon which radio access networks broadcast control information are scanned to detect broadcast signals broadcast thereon. Network information contained in the broadcast signals detected during the scanning operations is extracted and stored at a mobile-node table. Then, as indicated by the block 78, network information is stored.

Then, and as indicated at the decision block 82, a determination is made as to other additional scanning should be performed to detect signals broadcast by other networks. If yes, the YES branch is taken back to the block 76. Otherwise, the NO branch is taken to the block 84. At the block 84, services that are desired to be used are remembered. Then, a path is taken to the decision block 86.

At the decision block 86, a determination is made as to whether the network is a network identified in a listing of most-preferred networks. If so, the YES branch is taken to the block 88, and the network is selected as the network with which to communicate. And, a path is taken to the finish block 92. If, conversely, the network is not listed in the most-preferred listing, the NO branch is taken to the block 94 and an indication of a position in a listing of most-preferred or otherwise available networks is stored or, if the identity of the network is not stored in one of such listings, such information is analogously also stored.

A branch is taken to the block 96, and a determination is made as to whether there are additional networks from which to choose. If so, the YES branch is taken to the block 98, and a subsequent network on the list is chosen and a path is taken back to the decision block 86.

If, conversely, a determination is made at the decision block 96 that additional networks from which to chose are not available, the NO branch is taken to the decision block 102. At the decision block 102, a determination is made as to whether any of the networks, such as those shown in FIG. 1, are available. If so, the YES branch is taken to the block 104, and selection is made of a highest network listed in the Figure. Otherwise, the NO branch is taken to the decision block 106. At the decision block 106, a determination is made as to whether any of the networks are listed in the listing shown in FIG. 2. If so, the YES branch is taken to the block 108, and selection is made from the listing 34 that identifies the most-preferred networks. Selection is made of the highest-listed network in the listing. Conversely, if a determination is made at the decision block 106 that none of the identified networks are listed in the most-preferred listing, the NO branch is taken to the block 112. At the block 112, a network is chosen in another manner, such as by random, or otherwise most-favorably listed. Upon selection of a network at any of the blocks 104, 108, or 112, a path is taken to the end block 114.

Thereby, the selection is made of the available network that provides the selected communication service. And, by utilizing lists that define preference levels, and successively accessing the, if needed, successive ones of the lists, selection is made of the most-preferred, available network that provides the selected communication service.

Figure 6:
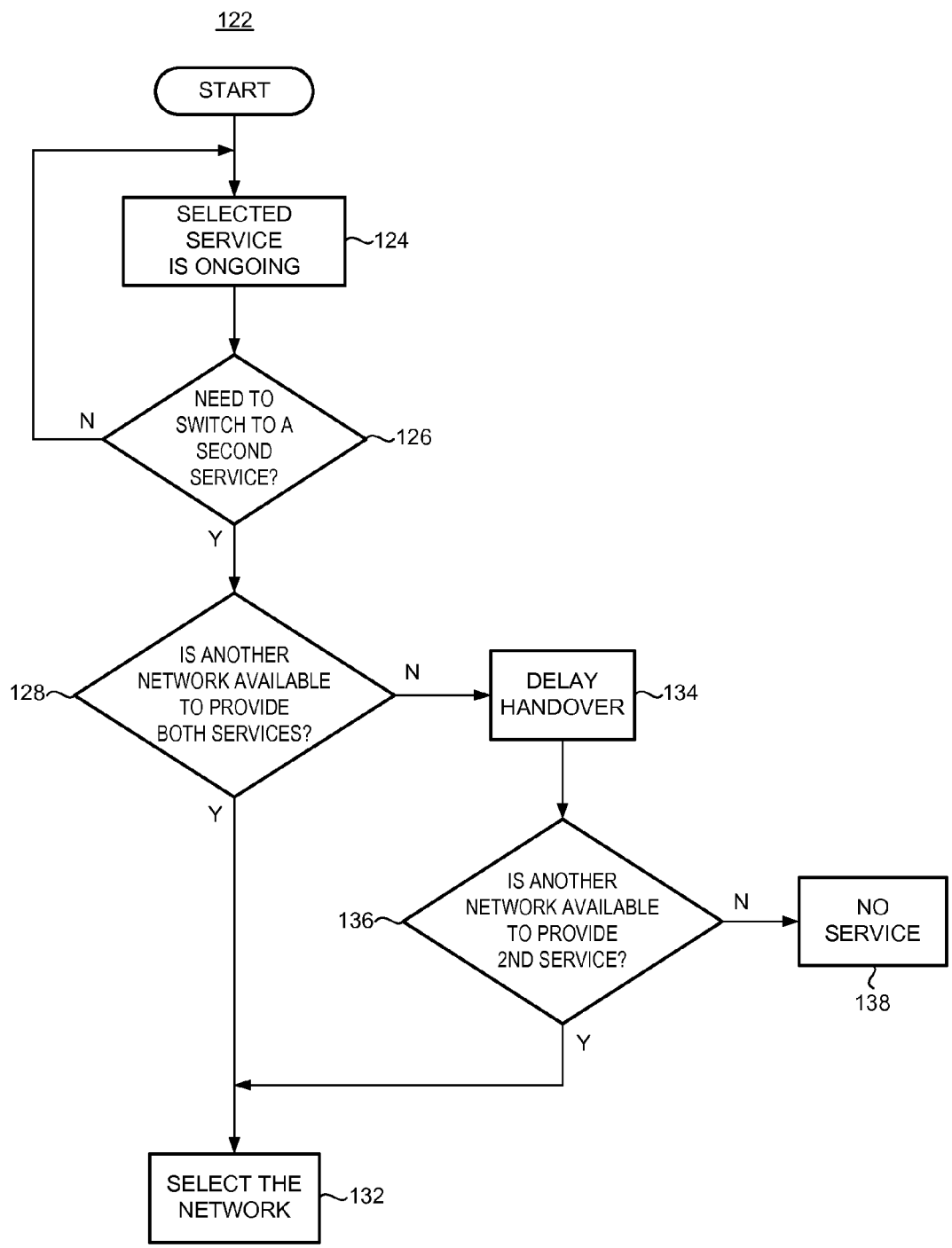
FIG. 6 illustrates another flow chart, also representative of operation of the radio communication system pursuant to an embodiment of the present invention.

FIG. 6 illustrates a flow diagram 122, representative of further operation of an embodiment of the present invention. Here, a selected communication service is ongoing, as indicated by the block 124. As the mobile node is mobile, the mobile node might be traveling out of one coverage area and into another coverage area. And, a second communication service might be also initiated. If a second communication service is initiated while a first communication service is ongoing, a preferred mode of operation is to hand over communications to a radio access network that is capable of continuing the first communication service and also providing the second communication service.

Accordingly, pursuant to an embodiment of the present invention, a determination is made as indicated by the decision block 126 as to whether there is a need to perform the second communication service. If not, the NO branch is taken back to the block 124. Otherwise, the YES branch is taken to the decision block 128.

At the decision block 128, a determination is made as to whether another network is available to provide both the ongoing as well as the second selected communication service. A process, analogous to the process shown in 72, is performed, for instance, at the decision block 128, to make such determination. If another network is available, the YES branch is taken to the block 132 and the network is selected for the continuance of communications pursuant to the first communication service and pursuant to which effectuation of the second communication service is performed. Otherwise, the NO branch is taken to the block 134. At the block 134, the handover is delayed until the completion of the first communication service, and a determination is then made, as indicated by the decision block 136, as to whether a network is available to perform the second communication service. If so, the YES branch is taken to the block 132, and communications are attempted with the selected network. Otherwise, service is unavailable and a branch is taken to the block 138 indicative of no service.

Figure 7:
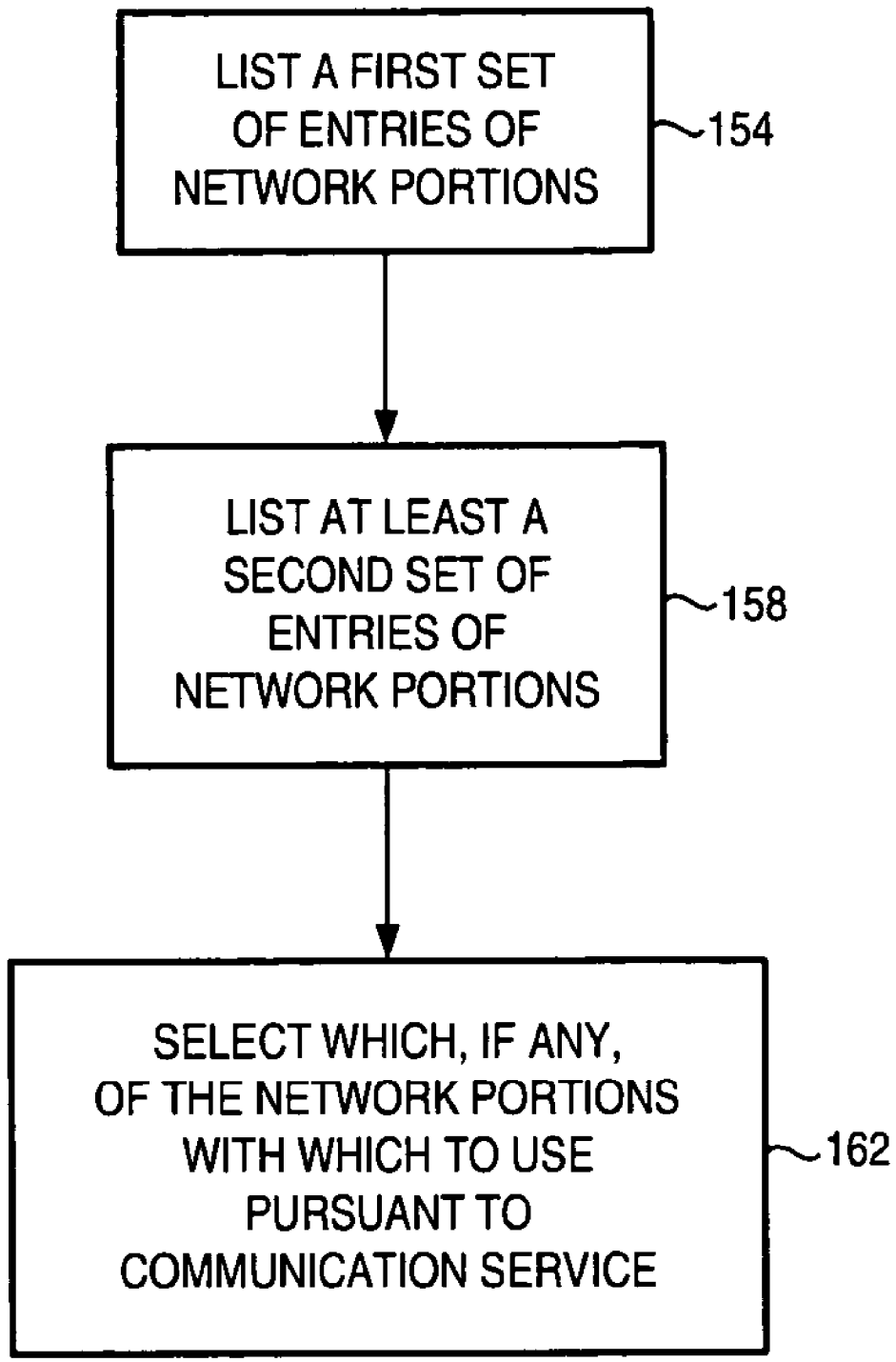
FIG. 7 illustrates a method flow diagram listing the method steps of the method of operation of an embodiment of the present invention.

FIG. 7 illustrates a method flow diagram, shown generally at 152, of the method of operation of an embodiment of the present invention. The method facilitates selection, at a mobile node, with which, if any, of a first and at least second network portion, of a network of a radio communication system with which to effectuate a first selected communication service.

First, and as indicated by the block 154, a first set of entries of network portions is listed. Each entry of the first set of entries is associated with a first level of preference by the mobile node with which to communicate. And, as indicated by the block 158, at least a second set of network portions is listed. Each entry of the second set of entries identifies network portions associated with a second level of preference by the mobile node with which to communicate.

Then, and as indicated by the block 162, selection is made of with which, if any, of the first and at least second network portions to effectuate the first selected communication service. Selection is made responsive to which, if any, of the first and at least second sets of communication services that the first selected communication service is a member and also with which of the first and at least second sets of entries that an associated one of the first and at least second network portions is associated.

Thereby, the mobile node attempts to communicate with radio access networks that available, are able to provide the selected communication service, and are preferred in at least selected tiers of service.

The previous descriptions are of preferred examples for implementing the invention, and the scope of the invention should not necessarily be limited by this description. The scope of the present invention is defined by the following claims.

What is claimed is:

1. Apparatus for facilitating network selection by a mobile node operable on at least one of a plurality of radio access networks, said apparatus comprising:

a storage element configured to store at least a first database listing and a second database listing, each of the first database listing and the second database listing being formed of entries that identify radio access networks, each of the entries including an identification of a radio access network and at least one communication service identifier associated with the radio access network, wherein the first database listing is associated with a first preference level, and wherein the second database listing is associated with a second preference level; and a selector configured to receive an indication of when a selected communication service capability is to be performed, identify a communication service identifier associated with said selected communication service capability, and select a selected radio access network for said selected communication service capability by successively accessing, in order of preference level, at least the first database listing and the second database listing to select an entry that has the communication service identifier and that identifies an available radio access network.

2. The apparatus of claim 1, wherein the storage element is further configured to store a forbidden-list database listing being formed of forbidden-list entries that indicate a prohibited communication entry.

3. The apparatus of claim 2 wherein selection made by said selector of with which entry, if any, of the first and second radio access network list to effectuate the selected communication service capability is further responsive to whether the entry is entered at said forbidden-list database listing.

4. The apparatus of claim 1, wherein the storage element is further configured to store an available radio access network list having entries identifying present radio access network availability with an indication of each available radio access network to be presently available and communication service capability of each available radio access network, wherein groups of communication services of the plurality define tiers of network-portion capabilities, and wherein the indications of the communication services capabilities associated with each entry in said first database listing comprise identification of which tier of network-portion capability of the entry associated therewith.

5. The apparatus of claim 4 wherein selection made by said selector is responsive to determinations of whether the tiers of service associated with any entry of said first database listing comprises a tier that includes the selected communication service capability.

6. The apparatus of claim 1 further comprising a detector for detecting a coverage-area position of the mobile node.

7. The apparatus of claim 1 further comprising:
a determiner configured to decide whether a second communication service capability is being initiated while the selected communication service capability is ongoing and to provide indication that the second communication service capability is to be performed; and
said selector further configured to receive the second communication service capability indication identifying a second of the at least one identifier associated with said second communication service capability and to select an available radio access network from said first database having stored identifiers associated with both said selected communication service capability and said second communication service capability.

8. The apparatus of claim 1, wherein the first preference level is a higher preference than the second preference level.

9. A method for facilitating network selection, at a mobile node operable on at least one of a plurality of radio access networks, comprising:
storing, in a storage element, at least a first database listing and a second database listing, each of the first database listing and the second database listing being formed of entries that identify radio access networks, each of the entries including an identification of a radio access network and at least one communication service identifier associated with the radio access network,
wherein the first database listing is associated with a first preference level, and
wherein the second database listing is associated with a second preference level;
receiving an indication of a selected communication service capability to be performed;
identifying a communication service identifier associated with said selected communication service capability; and
selecting a selected radio access network for said selected communication service capability by successively accessing, in order of preference level, at least the first database listing and the second database listing to select an entry that has the communication service identifier and that identifies an available radio access network.

10. The method of claim 9 further comprising storing an available radio access network list having entries identifying present radio access network availability with an indication of each available radio access network to be presently available together with communication service capability of each available radio access network and wherein selection is made during said selecting of an entry listed on the second database listing if no entry of the first database listing is associated with the selected communication service capability.

11. The method of claim 9 wherein said selecting further comprises subsequently selecting an additional entry pursuant to effectuation of a second selected communication service capability.

12. The method of claim 9 further comprising;
determining whether a second communication service capability is being initiated while the selected communication service capability is ongoing;
providing an indication, in response to said determination, identifying a second identifier, of the at least one identifier, associated with said second communication service capability; and
selecting an available radio access network from said first database having stored identifiers associated with both said selected communication service capability and said second communication service capability.

13. The method of claim 9, wherein the first preference level is a higher preference than the second preference level.

14. Apparatus for facilitating network-selection by a mobile node operable on at least one of a plurality of radio access networks, said apparatus comprising:
storing, in a storage element, at least a first database listing associated with a first preference level and including a listing of radio access network entries, each entry including an identification of the radio access network and at least one communication service identifier identifying a communication service capability associated with the radio access network;
the storage element configured to store a forbidden-list database list having entries, each entry identifying a network with which the mobile node is prohibited from using and with which the mobile node does not attempt to select for communication; and
a selector configured to receive an indication of when a selected communication service capability is to be performed, to identify a communication service identifier associated with said selected communication service capability, and to select an available radio access network from said first database listing with a stored communication service identifier associated with said selected communication service capability, associated with the first preference level, that is not at the forbidden-list database list, and that is also capable of providing selected communication service capability to the mobile node.

15. The apparatus of claim 14, wherein the storage element is further configured to store at least a second database listing including at least a second radio access network list of entries, each entry thereof including identification of the radio access network and including identification of a communication service capability of the radio access network, and the second radio access network list of entries defining a second preference level associated with each entry thereof, the first preference level being a higher preference than the second preference level.

16. The apparatus of claim 15 wherein a selection is made by said selector of with which entry, if any, of the first and second radio access network lists to effectuate a communication service capability, selection made by successively accessing the first database listing and the second database listing, in order of preference level.

17. The apparatus of claim 14 further comprising an available radio access network list having entries identifying present radio access network availability with an indication of each available radio access network to be presently available and communication service capability of each available radio access network, wherein groups of communication services of the plurality define tiers of network-portion capabilities, and wherein the indications of the communication services capabilities associated with each entry in said first database listing comprise identification of which tier of network-portion capability of the entry associated therewith.

18. The apparatus of claim 17 wherein selection made by said selector is responsive to determinations of whether the tiers of service associated with any entry of said first database listing comprises a tier that includes the selected communication service capability.

19. The apparatus of claim 14 further comprising a detector for detecting a coverage-area position of the mobile node.

20. Apparatus for facilitating network selection by a mobile node operable on at least one of a plurality of radio access networks, said apparatus comprising:
   a storage element configured to store at least a first database listing associated with a first preference level and including a listing of radio access network entries, each entry including an identification of the radio access network and at least one communication service identifier identifying a communication service capability associated with the radio access network;
   the storage element configured to store a forbidden-list database listing a forbidden-list of entries, each entry of the forbidden-list of entries identifying a network with which the mobile node is prohibited from using and with which the mobile node does not attempt to select for communication; and
   a selector configured to receive an indication of when a selected communication service capability is to be performed, to identify a communication service identifier associated with said selected communication service capability, and to select an available radio access network from said first database listing having a stored communication service identifier associated with said selected communication service capability.

21. The apparatus of claim 20, wherein the storage element is further configured to store at least a second database listing including at least a second radio access network list of entries, each entry thereof including identification of the radio access network and including identification of a communication service capability of the radio access network, and the second radio access network list of entries defining a second preference level associated with each entry thereof.

22. The apparatus of claim 21 wherein a selection is made by said selector of with which entry, if any, of the first and second radio access network lists to effectuate a communication service capability.

23. The apparatus of claim 20 wherein said selector further is configured to determine whether the selected communication service capability is associated with any of the entries of the first radio access network list of said first database listing.

24. The apparatus of claim 20 further comprising an available radio access network list having entries identifying present radio access network availability with an indication of each available radio access network to be presently available and communication service capability of each available radio access network, wherein groups of communication services of the plurality define tiers of network-portion capabilities, and wherein the indications of the communication services capabilities associated with each entry in said first database listing comprise identification of which tier of network-portion capability of the entry associated therewith.

25. The apparatus of claim 24 wherein selection made by said selector is responsive to determinations of whether the tiers of service associated with any entry of said first database listing comprises a tier that includes the selected communication service capability.

26. The apparatus of claim 20 further comprising a detector for detecting a coverage-area position of the mobile node.

27. The apparatus of claim 20 further comprising:
   a determiner configured to decide whether a second communication service capability is being initiated while the selected communication service capability is ongoing and to provide indication that the second communication service capability is to be performed; and
   said selector further configured to receive the second communication service capability indication identifying a second of the at least one identifier associated with said second communication service capability and to select an available radio access network from said first database having stored identifiers associated with both said selected communication service capability and said second communication service capability.

* * * * *